(12) United States Patent
Koo et al.

(10) Patent No.: US 10,832,631 B2
(45) Date of Patent: Nov. 10, 2020

(54) DISPLAY DEVICE AND METHOD OF DRIVING THE SAME

(71) Applicant: Samsung Display Co., Ltd., Gyeonggi-Do (KR)

(72) Inventors: Jahun Koo, Asan-si (KR); Haksun Kim, Seoul (KR); Kyung-hun Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/426,531

(22) Filed: May 30, 2019

(65) Prior Publication Data

US 2019/0279596 A1     Sep. 12, 2019

Related U.S. Application Data

(63) Continuation of application No. 15/818,008, filed on Nov. 20, 2017, now Pat. No. 10,332,479.

(30) Foreign Application Priority Data

Nov. 25, 2016   (KR) .................. 10-2016-0158649

(51) Int. Cl.
*G09G 5/00*     (2006.01)
*G09G 3/20*     (2006.01)
*H04N 7/01*     (2006.01)

(52) U.S. Cl.
CPC .......... *G09G 5/005* (2013.01); *G09G 3/2092* (2013.01); *H04N 7/0122* (2013.01); *G09G 2310/08* (2013.01); *G09G 2320/103* (2013.01); *G09G 2340/04* (2013.01); *G09G 2340/0407* (2013.01); *G09G 2340/0435* (2013.01)

(58) Field of Classification Search
None
See application file for complete search history.

(56) References Cited

U.S. PATENT DOCUMENTS

| 9,438,331 | B2 | 9/2016 | Mills et al. |
| 9,721,525 | B2 | 8/2017 | Park et al. |
| 2004/0217953 | A1 | 11/2004 | Someya et al. |
| 2006/0017847 | A1 | 1/2006 | Tardif |

(Continued)

FOREIGN PATENT DOCUMENTS

| KR | 1020160017250 A | 2/2016 |
| KR | 1020160099277 A | 8/2016 |

*Primary Examiner* — Ryan M Gray
(74) *Attorney, Agent, or Firm* — Cantor Colburn LLP

(57) ABSTRACT

A display device includes a display panel which includes pixels arranged in a matrix form and a controller which receives a first image signal corresponding to a first active period of a first frame, outputs a first final output signal corresponding to a first conversion active period of the first frame, and drives the display panel based on the first final image signal. The controller includes a timing changing unit which receives the first image signal and changes a first image signal pixel size corresponding to the first image signal to a panel pixel size corresponding to the display panel to generate the first output signal, and a frequency changing unit which receives the first output signal from the timing changing unit and reduces a frame frequency of the first output signal based on the first image signal to output the first final output signal.

9 Claims, 9 Drawing Sheets

(56) References Cited

U.S. PATENT DOCUMENTS

| | | | |
|---|---|---|---|
| 2007/0229482 A1* | 10/2007 | Morinaga | G09G 5/006 345/204 |
| 2007/0285416 A1* | 12/2007 | Wang | G09G 3/3648 345/213 |
| 2008/0106542 A1* | 5/2008 | Park | G09G 5/008 345/212 |
| 2008/0158247 A1 | 7/2008 | Shibahara | |
| 2010/0118013 A1* | 5/2010 | Kitayama | G09G 3/3614 345/211 |
| 2010/0123832 A1* | 5/2010 | Kitayama | G09G 3/3611 348/731 |
| 2010/0201719 A1 | 8/2010 | Kimura | |
| 2011/0043700 A1* | 2/2011 | Ouyang | G09G 5/008 348/572 |
| 2012/0120205 A1* | 5/2012 | Kobayashi | G09G 3/003 348/51 |
| 2015/0009408 A1* | 1/2015 | Ikushima | H04N 7/08 348/723 |
| 2015/0161961 A1* | 6/2015 | Qu | G09G 3/20 345/212 |
| 2015/0170578 A1* | 6/2015 | Choi | G09G 3/3266 345/212 |
| 2015/0294640 A1 | 10/2015 | Lei et al. | |
| 2015/0304526 A1* | 10/2015 | Maurice | H04N 21/4307 348/513 |
| 2015/0348509 A1* | 12/2015 | Verbeure | H04N 9/3188 345/213 |
| 2016/0035297 A1* | 2/2016 | Oh | G09G 3/3618 345/212 |
| 2016/0239249 A1 | 8/2016 | Lee et al. | |
| 2017/0127116 A1 | 5/2017 | Maeda | |
| 2017/0243566 A1* | 8/2017 | Nakai | G09G 5/02 |
| 2018/0004340 A1 | 1/2018 | Yeh et al. | |
| 2018/0013978 A1 | 1/2018 | Duan et al. | |

* cited by examiner

FIG. 6

|  | FHD, 60Hz | | FHD, 50Hz | |
|---|---|---|---|---|
|  | A | B | A | B |
| Size | 2200 x 1152 | 1920 x 1080 | 2200 x 1152 | 1920 x 1080 |
| 1H Charge($\mu s$) | 4.82 | 5.14 | 4.81 | 6.17 |
| Comparison | 0.32$\mu s$(6.6%) Increase | | 1.36$\mu s$(28.3%) Increase | |

DISPLAY DEVICE AND METHOD OF DRIVING THE SAME

This application is a continuation of U.S. patent application Ser. No. 15/818,008, filed on Nov. 20, 2017, which claims priority to Korean Patent Application No. 10-2016-0158649, filed on Nov. 25, 2016, and all the benefits accruing therefrom under 35 U.S.C. § 119, the content of which in its entirety is herein incorporated by reference.

BACKGROUND

1. Field of Disclosure

Exemplary embodiments of the invention relate to a display device and a method of driving the same. More particularly, the exemplary embodiments of the invention relate to a display device capable of improving a charging rate of a display panel and a method of driving the display device.

2. Description of the Related Art

In general, a display device receives an image signal of a predetermined display mode from an image signal source, such as a computer system, a TV broadcast system etc., and displays an image corresponding to the image signal on a display screen. A display device employing a cathode ray tube ("CRT") has been superseded by flat panel display devices, e.g., a liquid crystal display, a plasma display panel, etc.

Different from the display device employing the CRT, the flat panel display device receives an analog image signal from the image signal source and converts the analog image signal to a digital image signal to display the image. Here, the analog image signal is converted to the digital image signal by an analog-to-digital converter ("A/D converter") included in the flat panel display device. The digital image signal converted by the A/D converter is provided to the liquid crystal display panel or the plasma display panel after being signal-processed through a predetermined signal processing process, and pixels in the flat panel display device are driven to display the image.

The display mode of the image signal provided from the image signal source like the computer system has various resolutions of 640*480, 800*600, 1024*768, 1600*1200, and 1920*1200. In a case that the resolution of the display device is 1024*768 and the image signal with a resolution of 640*480 is input to the display device as the image signal, the resolution is adjusted by a scaler included in the display device.

SUMMARY

Exemplary embodiments of the invention provide a display device capable of improving a charging rate of a display panel.

Exemplary embodiments of the invention provide a method of driving the display device.

According to an exemplary embodiment, a display device including a display panel which includes a plurality of pixels arranged in a matrix form and a controller which receives a first image signal corresponding to a first active period of a first frame, outputting a first final output signal corresponding to a first conversion active period of the first frame and driving the display panel based on the first final output signal. The controller includes a timing changing unit which receives the first image signal and changes a first image signal pixel size corresponding to the first image signal to a panel pixel size corresponding to the display panel to generate a first output signal and a frequency changing unit which receives the first output signal from the timing changing unit and reduces a frame frequency of the first output signal based on the first image signal to output the first final output signal. The number of rows of the first image signal pixel size is greater than the number of rows of the panel pixel size, and a length of the first conversion active period is longer than a length of the first active period.

In an exemplary embodiment, the number of columns of the first image signal pixel size may be greater than the number of columns of the panel pixel size, and the first conversion active period may include the first active period.

In an exemplary embodiment, the controller may further receive a second image signal corresponding to a second active period of a second frame following the first frame, further outputs a second final output signal corresponding to a second conversion active period of the second frame and further drives the display panel based on the second final output signal, the timing changing unit may further receive the second image signal and converts a second image signal pixel size corresponding to the second image signal to the panel pixel size to further generate a second output signal, and the frequency changing unit receives the first output signal and the second output signal from the timing changing unit, outputs the first and second final output signals a frame frequency of each of which is reduced from the frame frequency of the first output signal if the first output signal and the second output signal are same as each other, and outputs the first and second final output signals without reducing their frame frequencies if the first output signal and the second output signal are different from each other.

In an exemplary embodiment, the number of rows of the second image signal pixel size may be greater than the number of rows of the panel pixel size, and a length of the second conversion active period may be longer than a length of the second active period.

In an exemplary embodiment, the controller may further include a clock frequency changing unit which changes a frequency of an internal clock signal of the controller based on the first output signal.

In an exemplary embodiment, the clock frequency changing unit may include a phase-locked loop circuit.

In an exemplary embodiment, the controller may further receive a second image signal corresponding to a second active period of a second frame following the first frame, further outputs a second final output signal corresponding to a second conversion active period of the second frame, and drives the display panel based on the second final output signal, the timing changing unit may further receive the second image signal and converts a second image signal pixel size corresponding to the second image signal to the panel pixel size to further generate a second output signal, and the frequency changing unit may receive the first output signal and the second output signal from the timing changing unit and generates the first final output signal obtained by reducing a frame frequency as much as a first frequency and the second final output signal obtained by reducing the frame frequency as much as a second frequency greater than the first frequency.

In an exemplary embodiment, the first frequency may be about 1 Hz, and the second frequency may be about 2 Hz.

In an exemplary embodiment, the length of a vertical blank period of the first image signal may be longer than the length of a vertical blank period of the first output signal.

According to an exemplary embodiment, a method of driving a display device including receiving a first image signal corresponding to a first active period of a first frame, converting a first image signal pixel size corresponding to the first image signal to a panel pixel size corresponding to a display panel to generate a first output signal corresponding to a first conversion active period of a first frame, reducing a frame frequency of the first output signal based on the first image signal, outputting a first final output signal reduced its frame frequency from the frame frequency of the first output signal, and driving the display panel based on the first final output signal. The number of rows of the first image signal pixel size is greater than the number of rows of the panel pixel size, and a length of the first conversion active period is longer than a length of the first active period.

In an exemplary embodiment, the number of columns of the first image signal pixel size may be greater than the number of columns of the panel pixel size, and the first conversion active period may include the first active period.

In an exemplary embodiment, the method may further include receiving a second image signal corresponding to a second active period of a second frame following the first frame, converting a second image signal pixel size corresponding to the second image signal to the panel pixel size to generate a second output signal corresponding to a second conversion active period of the second frame, outputting a second final output signal, and driving the display panel based on the second final output signal, where outputting a second final output signal may include outputting the second final output signal a frame frequency of which is reduced from a frame frequency of the second output signal if the first output signal and the second output signal are same as each other and outputting the second final output signal without reducing the frame frequency if the first output signal and the second output signal are different from each other.

In an exemplary embodiment, the number of rows of the second image signal pixel size may be greater than the number of rows of the panel pixel size, and a length of the second conversion active period may be longer than a length of the second active period.

In an exemplary embodiment, the method may further include changing a frequency of an internal clock signal based on the first output signal.

In an exemplary embodiment, the changing the frequency of the internal clock signal may be performed by a phase-locked loop circuit.

In an exemplary embodiment, the method may further include receiving a second image signal corresponding to a second active period of a second frame following the first frame, converting a second image signal pixel size corresponding to the second image signal to the panel pixel size to generate a second output signal corresponding to a second conversion active period of the second frame, outputting a second final output signal, and driving the display panel base on the second final output signal, where outputting the first final output signal may include outputting the first final output signal obtained by reducing the frame frequency of the first output signal as much as a first frequency, and outputting the second final output signal includes outputting the second final output signal obtained by reducing a frame frequency of the second output signal as much as a second frequency greater than the first frame frequency.

In an exemplary embodiment, the first frequency may be about 1 Hz, and the second frame frequency may be about 2 Hz.

In an exemplary embodiment, the length of a vertical blank period of the first image signal may be longer than the length of a vertical blank period of the first output signal.

According to the above, when the first image signal is changed to the first output signal by the timing changing unit, the size and the blank time are reduced. Thus the gate-on period of each of the pixel lines increases, and the charging rate of the display panel is improved. In addition, since the frame frequency is reduced by the frequency changing output unit, the gate-on period of each of the pixel lines further increases, and the charging rate of the display panel is further improved.

BRIEF DESCRIPTION OF THE DRAWINGS

The above and other advantages of the invention will become readily apparent by reference to the following detailed description when considered in conjunction with the accompanying drawings wherein:

FIG. 6 is a table explaining an exemplary effect according to the invention;

DETAILED DESCRIPTION

Figure 1:
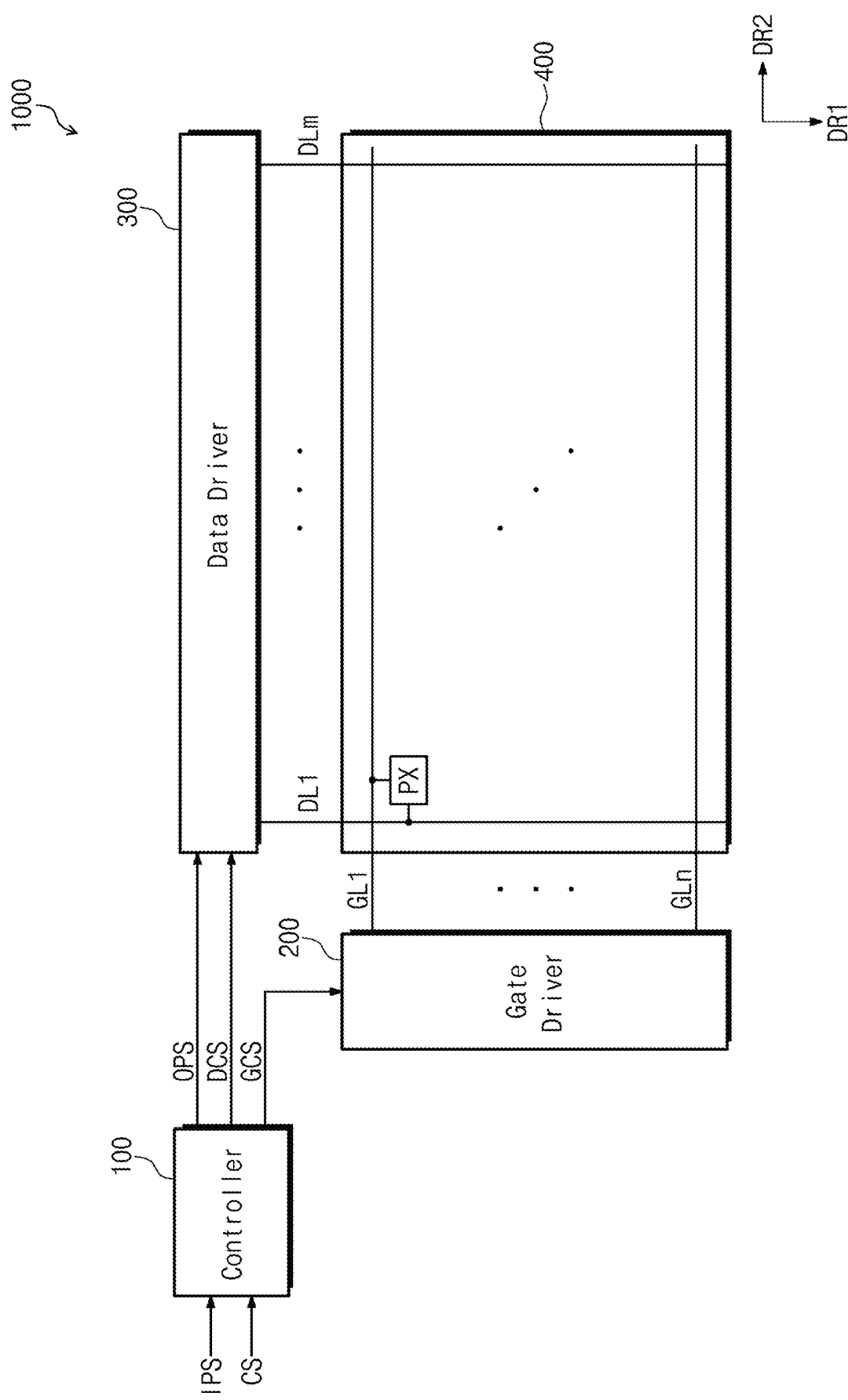
FIG. 1 is a block diagram showing an exemplary embodiment of a display device according to the invention.

The following description with reference to the accompanying drawings is provided to assist in a comprehensive understanding of various exemplary embodiments of the invention as defined by the claims and their equivalents. It includes various specific details to assist in that understanding hut these are to be regarded as merely exemplary. Accordingly, those of ordinary skill in the art will recognize that various changes and modifications of the various exemplary embodiments described herein can be made without departing from the scope and spirit of the invention.

Like numerals refer to like elements throughout. In the drawings, the thickness of layers, films, and regions are exaggerated for clarity. The use of the terms first, second, etc. do not denote any order or importance, but rather the terms first, second, etc. are used to distinguish one element from another. Thus, a first element, component, region, layer or section discussed below could be termed a second element, component, region, layer or section without departing from the teachings of the present disclosure. It is to be understood that the singular forms "a," "an," and "the" include plural referents unless the context clearly dictates otherwise.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Hereinafter, the present invention will be explained in detail with reference to the accompanying drawings.

FIG. 1 is a block diagram showing an exemplary embodiment of a display device 1000 according to the invention.

Referring to FIG. 1, the display device 1000 according to the exemplary embodiment of the invention includes a display panel 400 displaying an image, gate and data drivers 200 and 300 driving the display panel 400, and a controller 100 controlling a drive of the gate and data drivers 200 and 300.

The controller 100 receives an image signal IPS and a plurality of control signals CS from the outside of the display device 1000. The controller 100 converts a data format of the image signal IPS to a data format of a final output signal OPS, which is adaptive to an interface of the data driver 300 and provides the final output signal OPS to the data driver 300.

In addition, the controller 100 generates a data control signal DCS, e.g., an output start signal, a horizontal start signal, etc., and a gate control signal GCS, e.g., a vertical start signal, a vertical clock signal, a vertical clock bar signal, etc., based on the control signals CS. The data control signal DCS is provided to the data driver 300, and the gate control signal GCS is provided to the gate driver 200.

The gate driver 200 sequentially outputs gate signals in response to the gate control signal GCS provided from the controller 100.

The data driver 300 converts the final output signal OPS to data voltages in response to the data control signal DCS provided from the controller 100 and outputs the data voltages. The data voltages are provided to the display panel 400.

The display panel 400 includes a plurality of gate lines GL1 to GLn, a plurality of data lines DL1 to DLm, and a plurality of pixels PX. For the convenience of explanation, FIG. 1 shows one pixel PX, however, the display panel 400 may include a plurality of pixels PX arranged in a matrix form.

The pixels PX may display different colors from each other among red, green, and blue colors, but the colors displayed by the pixels PX should not be limited thereto or thereby.

The gate lines GL1 to GLn extend in a second direction DR2 and are arranged to be substantially parallel to each other in a first direction DR1 substantially vertical to the second direction DR2. The gate lines GL1 to GLn are connected to the gate driver 200 to receive gate signals from the gate driver 200.

The data lines DL1 to DLm extend in the first direction DR1 and are arranged to be substantially parallel to each other in the second direction DR2. The data lines DL1 to DLm are connected to the data driver 300 to receive data voltages from the data driver 300.

Each of the pixels PX is connected to a corresponding gate line among the gate lines GL1 to GLn and a corresponding data line among the data lines DL1 to DLm.

Figure 2:
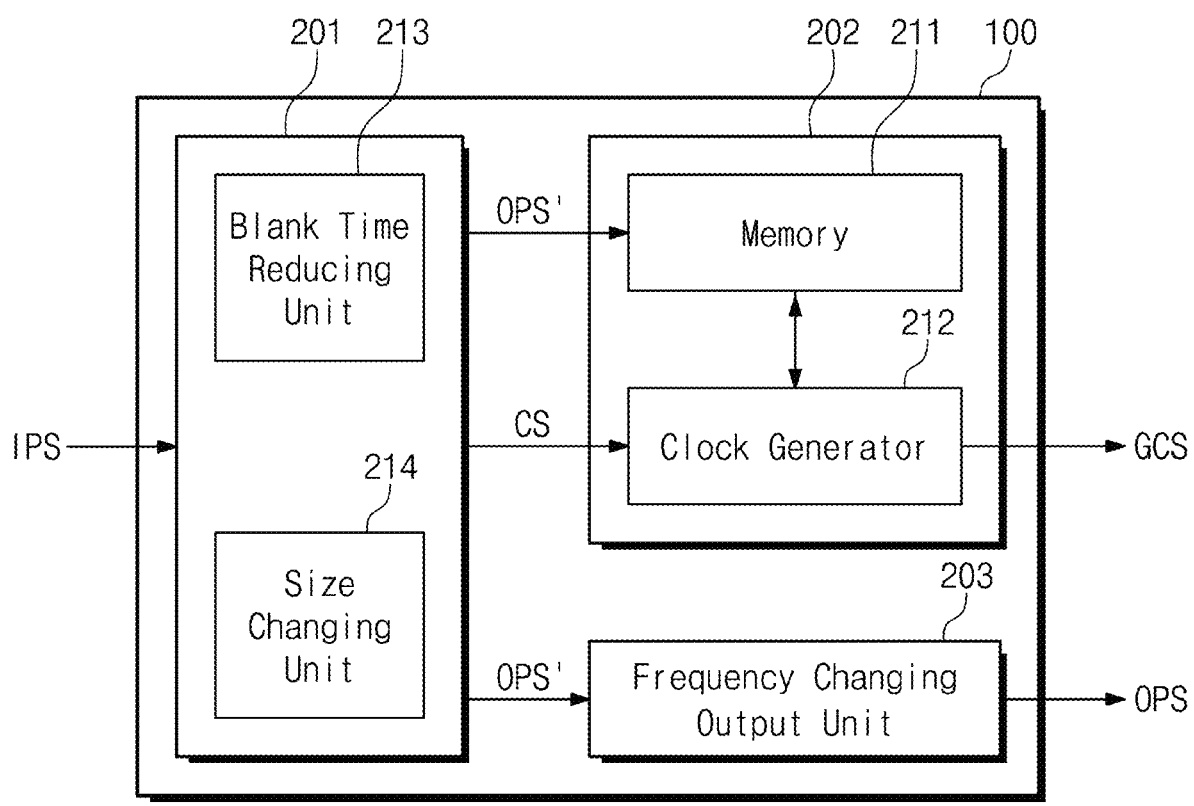
FIG. 2 is a block diagram showing an exemplary embodiment of a controller according to of the invention.
Figure 3:
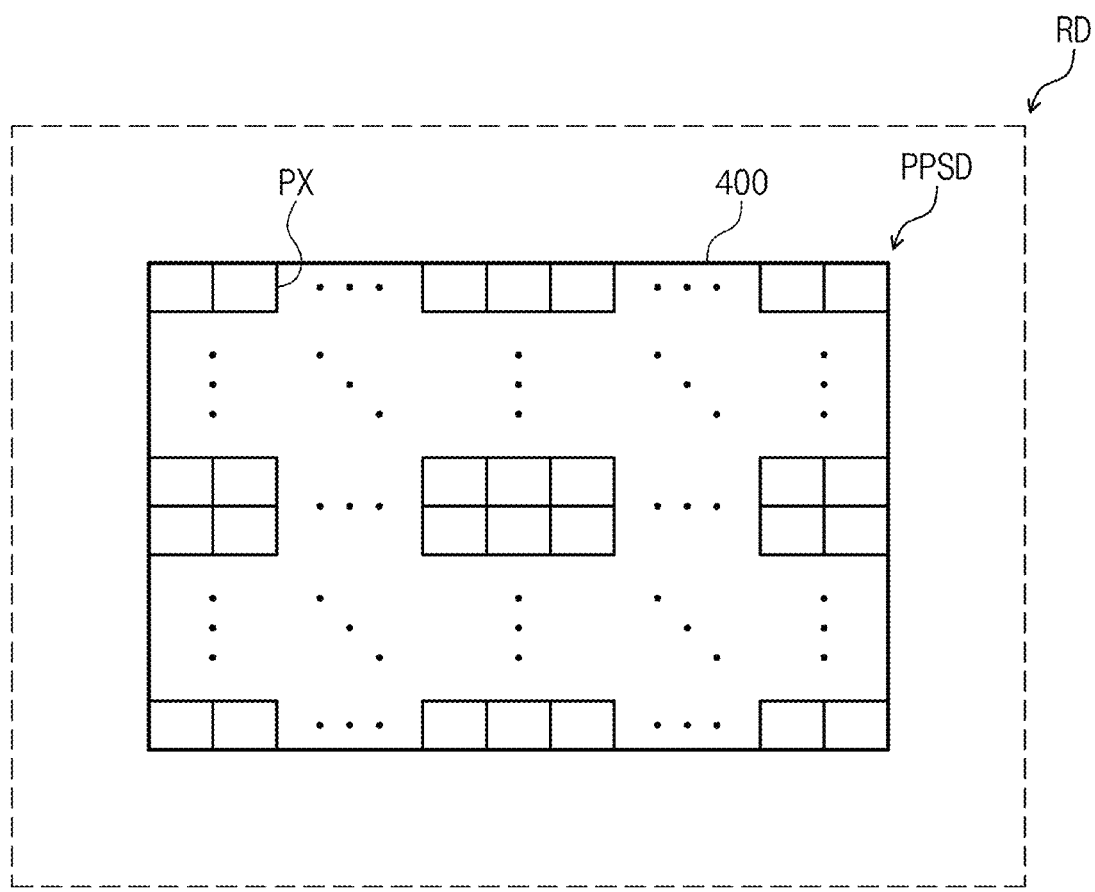
FIG. 3 is a diagram showing an exemplary embodiment of a first image signal pixel size and a panel pixel size according to the invention.
Figure 4A:
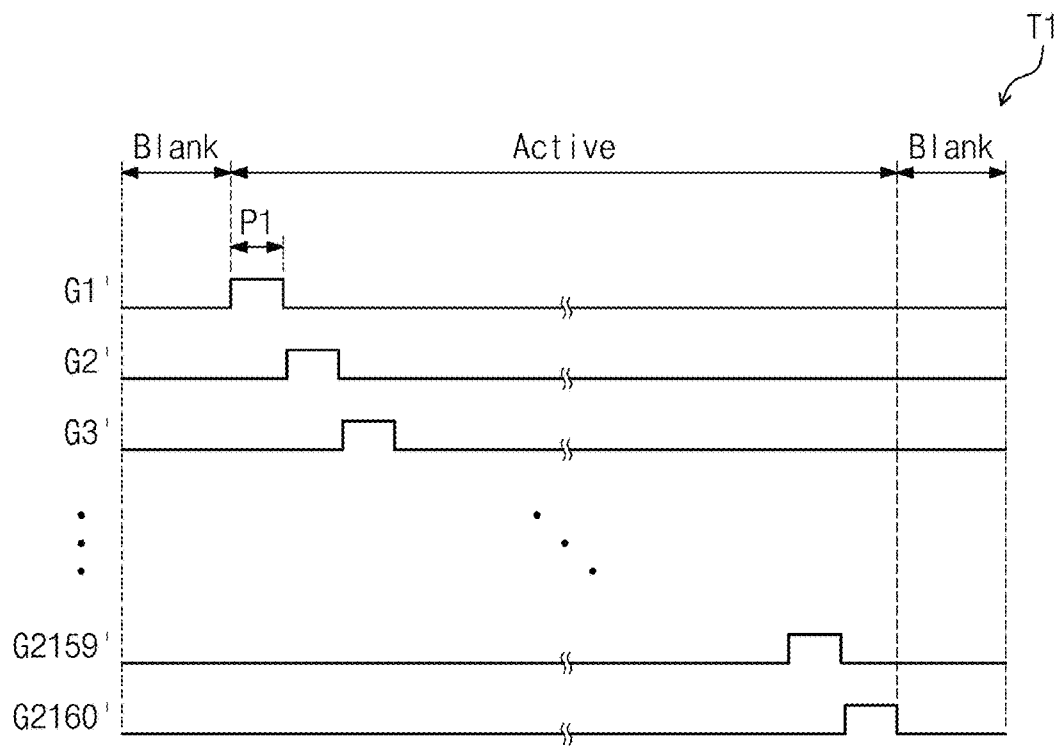
FIG. 4A and FIG. 4B are timing diagrams showing an exemplary embodiment of an operation of a timing changing unit according to the invention.
Figure 4B:
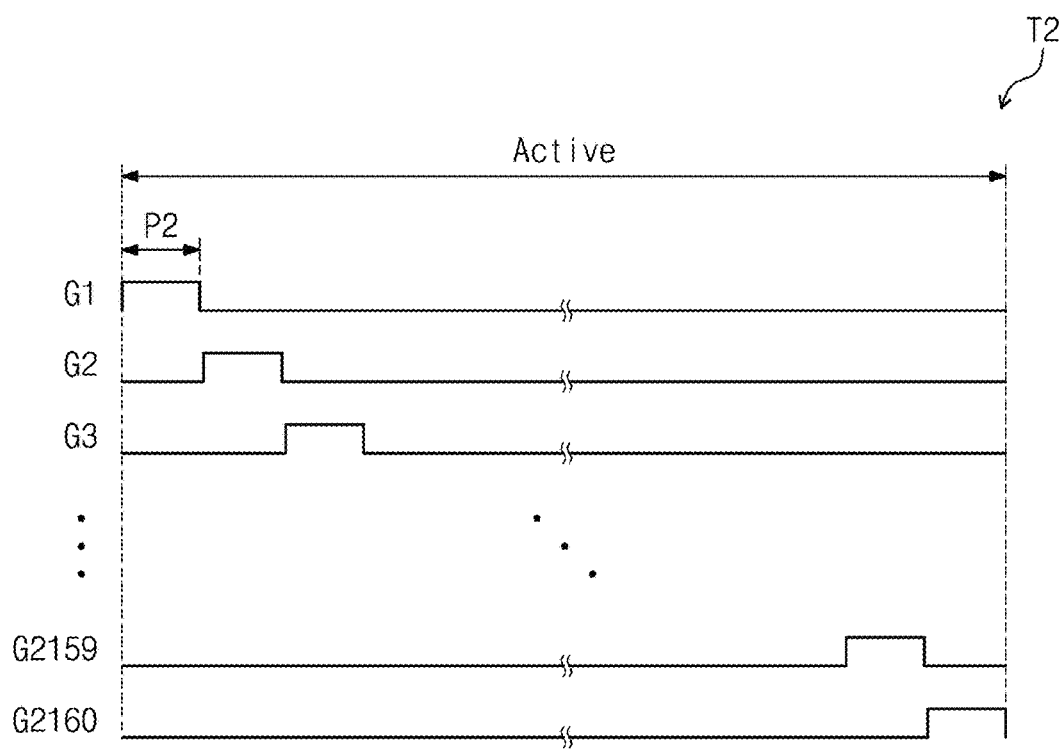
Figure 5A:
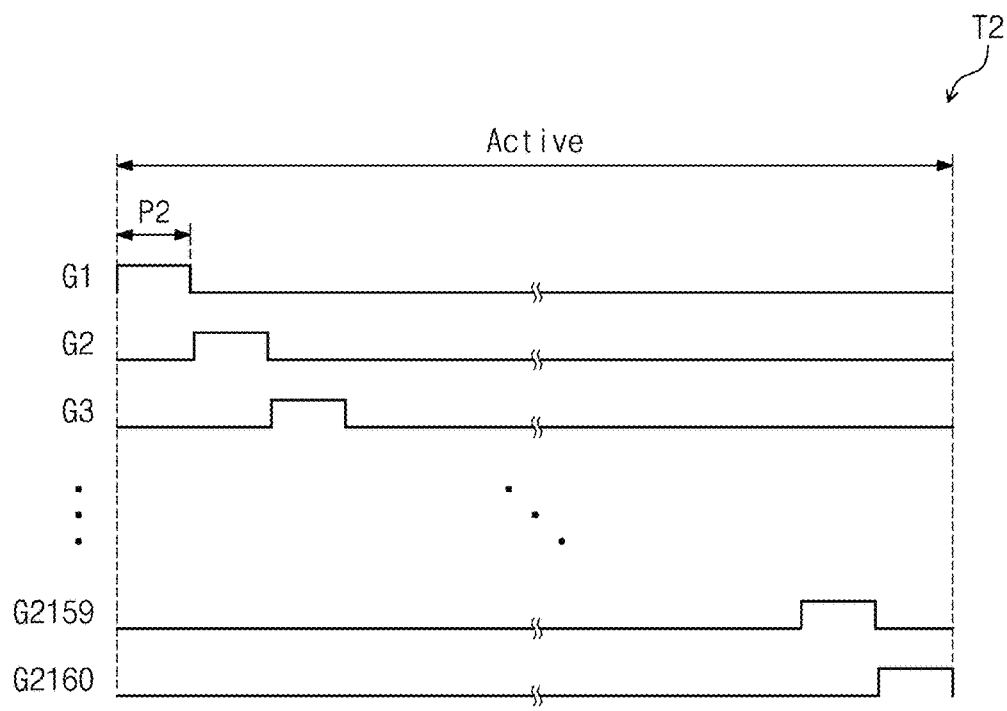
FIG. 5A and FIG. 5B are timing diagrams showing an exemplary embodiment of an operation of a frequency changing output unit according to the invention.
Figure 5B:
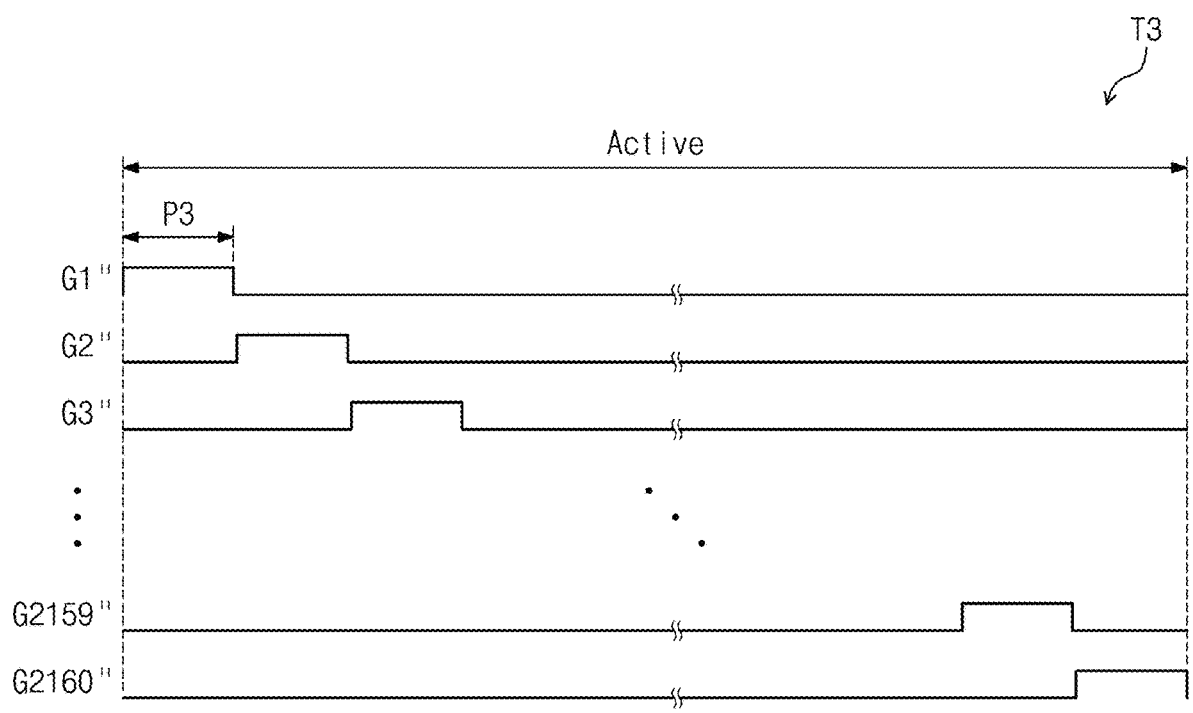

FIG. 2 is a block diagram showing an exemplary embodiment of the controller 100 according to the invention. FIG. 3 is a diagram showing an exemplary embodiment of a first image signal pixel size RD and a panel pixel size PPSD according to the invention. FIG. 4A and FIG. 4B are timing diagrams showing an exemplary embodiment of an operation of a timing changing unit 201 according to the invention. FIG. 5A and FIG. 5B are timing diagrams showing an exemplary embodiment of an operation of a frequency changing output unit 203 according to the invention. FIG. 6 is a table explaining an exemplary effect according to the invention.

Referring to FIG. 2, the controller 100 includes the timing changing unit 201, a clock frequency changing unit 202, and the frequency changing output unit 203.

In the following descriptions, the image signal IPS (hereinafter, referred to as a "first image signal") corresponds to a first active period (not shown) of one frame (hereinafter, referred to as a "first frame"), and the final output signal OPS corresponds to a first conversion active period (not shown) of the first frame.

FIG. 2 shows the image signal and the output signal, which correspond to only one frame, however, the invention is not limited thereto. Other exemplary embodiments may be applied to the image signal and the output signal, which correspond to two or more frames.

The first active period may correspond to a period in which the first image signal IPS is output through the display panel 400 (refer to FIG. 1) without modification in the first frame. The first conversion active period may correspond to a period in which the final output signal OPS is output through the display panel 400. In an exemplary embodiment, each of the first active period and the first conversion active period may be smaller than the period of the first frame. This will be described in detail with reference to FIG. 4A and FIG. 4B.

The timing changing unit 201 may receive the first image signal IPS. The timing changing unit 201 may convert the first image signal pixel size RD (refer to FIG. 3) corresponding to the first image signal IPS to the panel pixel size PPSD (refer to FIG. 3) corresponding to the display panel 400 to generate a first output signal OPS'. The first image signal pixel size RD means the number of columns and rows of pixels in the first image signal IPS, and The panel pixel size PPSD means the number of columns and rows of pixels in the display panel 400. Referring to FIGS. 2 and 3, the first image signal pixel size RD may be greater than the panel pixel size PPSD. In more detail, the number of rows of the first image signal pixel size RD may be greater than the number of rows of the panel pixel size PPSD, and the number of columns of the first image signal pixel size RD may be greater than the number of columns of the panel pixel size PPSD. In an exemplary embodiment, the number of columns of the first image signal pixel size RD may be 4336, and the number of rows of the first image signal pixel size RD may be 2317, but they should not be limited thereto or thereby. The first image signal pixel size RD may be varied depending on a scaler (not shown).

In an exemplary embodiment, the number of columns of the panel pixel size PPSD may be 3840, and the number of rows of the panel pixel size PPSD may be 2160, but the invention should not be limited thereto or thereby. The panel pixel size PPSD may be varied depending on a size of the display panel of the display device.

The timing changing unit 201 may include a blank time reducing unit 213 and a size changing unit 214.

The blank time reducing unit 213 may reduce or remove a blank time of the first frame. In an exemplary embodiment, the blank time reducing unit 213 may remove a vertical blank time of the first frame. When the vertical blank time is removed, the first active period increases to be the first conversion active period. Consequently, the first conversion active period may become greater than the first active period as described above.

The size changing unit 214 may change the first image signal pixel size RD of the first image signal IPS to the panel pixel size PPSD. Detailed descriptions of the first image signal pixel size RD and the panel pixel size PPSD are omitted since they have been described already.

Referring to FIGS. 2, 3, 4A and 4B, a first timing diagram T1 shows a gate-on period of each of pixel lines G1' to G2160' in a case that the display panel 400 (refer to FIG. 1) is driven by the first image signal IPS that does not pass through the timing changing unit 201.

A second timing diagram T2 shows a gate-on period of each of pixel lines G1 to G2160 in a case that the display panel 400 (refer to FIG. 1) is driven by the first output signal OPS' that is generated by the timing changing unit 201.

In the following descriptions associated with FIGS. 4A and 4B, the number of columns of the panel pixel size PPSD is 3840, and the number of rows of the panel pixel size PPSD is 2160. However, the invention should not be limited thereto or thereby.

Referring to the first timing diagram T1, the first pixel line to the $2160^{th}$ pixel line G1' to G2160' are sequentially turned on (i.e., gate-on) in an active period (i.e., the first active period), and thus the image is displayed. The first pixel line G1' may correspond to pixels arranged in a first row among the pixels PX, the second pixel line G2' may correspond to pixels arranged in a second row among the pixels PX, and the third pixel line G3' may correspond to pixels arranged in a third row among the pixels PX. In addition, the $2159^{th}$ pixel line 2159' may correspond to pixels arranged in a $2159^{th}$ row among the pixels PX, and the $2160^{th}$ pixel line 2160' may correspond to pixels arranged in a $2160^{th}$ row among the pixels PX.

In the first timing diagram T1, the pixel lines G1' to G2160' may have the same gate-on periods, each of which amounts to a first period P1. That is, lengths of 2160 first periods P1, which are sequentially shown in the first timing diagram T1, may be the same as each other.

The active period of the second timing diagram T2 may be longer than the active period, i.e., the first active period, of the first timing diagram T1. This is because, as described above, the vertical blank time existing in the first timing diagram T1 is removed by the timing changing unit 201, and the period corresponding to the vertical blank time is used as the active period. Accordingly, referring to the second timing diagram T2, the first pixel line to the $2160^{th}$ pixel line are sequentially turned on corresponding to the increased active period, and thus the image is displayed. A length of a second period P2 corresponding to the gate-on period of each of the first pixel line to the $2160^{th}$ pixel line G1 to G2160 in the second timing diagram T2 may be longer than a length of a first period P1 corresponding to the gate-on period of each of the pixel lines G1' to G2160' in the first timing diagram T1.

Referring to FIG. 2, the clock frequency changing unit 202 includes a memory 211 and a clock generator 212. The memory 211 receives the first output signal OPS' obtained by changing the size and blank time of the first image signal IPS from the timing changing unit 201 and stores the first output signal OPS'.

The clock generator 212 receives the first output signal OPS' from the memory 211 and changes a frequency of an internal clock signal of the controller 100 in synchronization with the first output signal OPS'. That is, the clock generator 212 outputs the gate control signal GCS including the changed internal clock signal, and the gate control signal GCS is used to control the gate driver 200 (refer to FIG. 1) as described above. In an exemplary embodiment, the clock generator 212 may include a phase-locked loop ("PLL") circuit.

Referring to FIGS. 2, 3, 4A, 4B, 5A, and 5B, the frequency changing output unit 203 receives the first output signal OPS'. The frequency changing output unit 203 changes a frame frequency of the first output signal OPS'. In an exemplary embodiment, the frequency changing output unit 203 changes the frame frequency of the first output signal OPS' to about 50 Hz from about 60 Hz.

FIGS. 5A and 5B show the second timing diagram T2 and a third timing diagram T3, respectively. Since the second timing diagram T2 is the same as described above, hereinafter, the third timing diagram T3 will be described in detail.

The third timing diagram T3 shows a third period P3 corresponding to the gate-on period of each of the pixel lines G1" to G2160" in a case that the display panel 400 is driven by the final output signal OPS whose the frame frequency is reduced to about 50 Hz.

In FIGS. 5A and 5B, the number of columns of the panel pixel size PPSD is 3840, and the number of rows of the panel pixel size PPSD is 2160. However, the invention should not be limited thereto or thereby.

The first conversion active period may include the first active period. In the third timing diagram T3, the vertical blank time is removed by the timing changing unit 201 similar to the second timing diagram T2, and the frame frequency is reduced (e.g., to about 50 Hz) by the frequency changing output unit 203, and thus the active period (i.e., the first conversion active period) of the third timing diagram T3 may increase more than that of the second timing diagram T2.

Accordingly, a length of the third period P3 corresponding to the gate-on period of each of the pixel lines G1" to G2160" in the third timing diagram T3 may be longer than the length of the second period P2 corresponding to the gate-on period of each of the pixel lines G1 to G2160 in the second timing diagram T2.

FIG. 6 is a table explaining an exemplary effect caused by the timing changing unit 201 (refer to FIG. 2) and the frequency changing output unit 203 (refer to FIG. 2) according to the invention.

The table shown in FIG. 6 provides information associated with a Full High Definition ("FHD") product, but the invention should not be limited to the FHD product. In the case that the frame frequency is about 60 Hz which is not reduced and a size and a blank time of an A product are not reduced by the timing changing unit 201 (refer to FIG. 2), a charging time of the A product is about 4.82 μs. On the other hand, in the case that the frame frequency is about 60 Hz which is not reduced and a size and a blank time of a B product is reduced by the timing changing unit 201 (refer to FIG. 2), a charging time increases to about 5.14 μs. That is, the charging rate increases by about 6.6% compared to the previous case.

In a case that the frame frequency of the B product is reduced to about 50 Hz by the frequency changing output unit 203 (refer to FIG. 2) additionally, the charging rate increases to about 6.17 μs from about 5.14 μs additionally.

Consequently, since the first image signal IPS (refer to FIG. 2) is converted to the first output signal OPS' (refer to FIG. 2) having reduced size and blank time of the first image signal IPS by the timing changing unit 201 (refer to FIG. 2), the gate-on period of each of the pixel lines increases, and thus the charging rate of the display panel is improved. In addition, since the frame frequency is reduced by the frequency changing output unit 203 (refer to FIG. 2), the gate-on period of each of the pixel lines more increases, and thus the charging rate is more improved.

Figure 7:
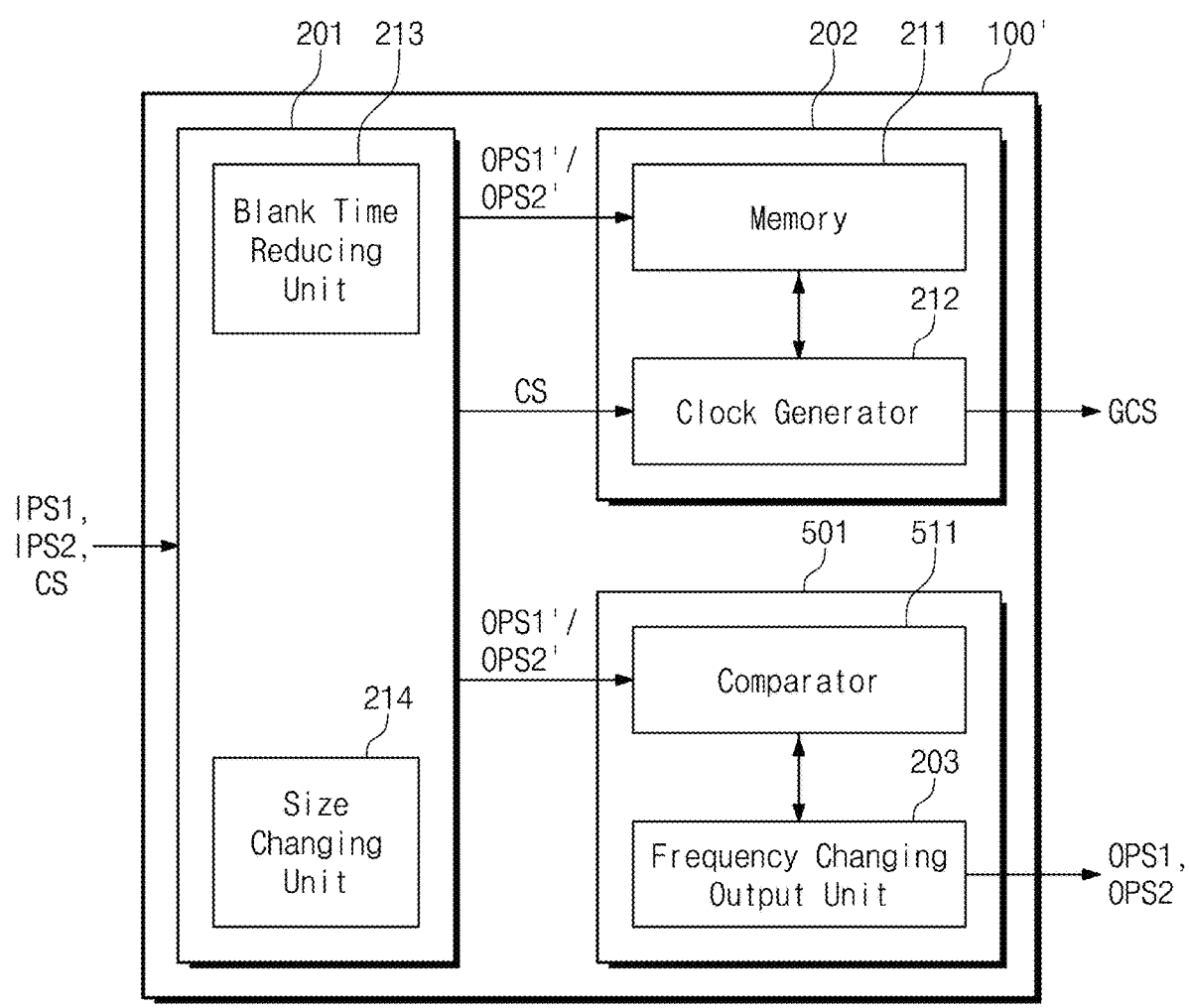
FIG. 7 is a block diagram showing another exemplary embodiment of a controller according to the invention.

FIG. 7 is a block diagram showing another exemplary embodiment of a controller 100' according to the invention.

In the following descriptions, an image signal may include a first image signal IPS1 and a second image signal IPS2. The first image signal IPS1 may correspond to a first active period of one frame (hereinafter, referred to as a "first frame"), and the second image signal IPS2 may correspond to a second active period of a frame (hereinafter, referred to as a "second frame") following the first frame.

In addition, an output signal may include a first final output signal OPS1 and a second final output signal OPS2. The first final output signal OPS1 may correspond to a first conversion active period of the first frame, and the second final output signal OPS2 may correspond to a second conversion active period of the second frame.

FIG. 7 shows the image signal and the output signal, which correspond to two frames. However, in another exemplary embodiment, the invention may be applied the image signal and the output signal, which correspond to three or more frames.

Referring to FIG. 7, a timing changing unit 201 receives the first image signal IPS1 and the second image signal IPS2. The timing changing unit 201 converts the first image signal pixel size RD (refer to FIG. 3) to the panel pixel size PPSD (refer to FIG. 3), converts the second image signal pixel size (not shown) corresponding to the second image signal IPS2 to the panel pixel size PPSD, and reduces the blank time of each of the first and second image signals IPS1 and IPS2 to generate a first output signal OPS1' and a second output signal OPS2', respectively.

The clock frequency changing unit 202 may receive the first output signal OPS1', the second output signal OPS2' and the control signals CS, and outputs the gate control signal GCS based on the first output signal OPS1', the second output signal OPS2', and the control signals CS.

The controller 100' shown in FIG. 7 may further include a frequency control unit 501 compared to the exemplary embodiment shown in FIG. 2.

The frequency control unit 501 may include the frequency changing output unit 203 described with reference to FIG. 2 and a comparator 511.

The comparator 511 receives the first output signal OPS1' and the second output signal OPS2'. The comparator 511 checks whether the first output signal OPS1' and the second output signal OPS2' are the same as each other. In a case that the first output signal OPS1' and the second output signal OPS2' are the same as each other, the comparator 511 determines that each of the first output signal OPS1' and the second output signal OPS2' is a still image, and in a case that the first output signal OPS1' and the second output signal OPS2' are different from each other, the comparator 511 determines that each of the first output signal OPS1' and the second output signal OPS2' is a moving image.

In the case that it is determined that each of the first output signal OPS1' and the second output signal OPS2' is the still image by the comparator 511, the frequency changing output unit 203 may output a first final output signal OPS1 and a second final output signal OPS2 the frame frequency of each of which is reduced from those of the first output signal OPS1' and the second output signal OPS2', respectively.

In the case that it is determined that each of the first output signal OPS1' and the second output signal OPS2' is the moving image by the comparator 511, the frequency changing output unit 203 may output the first output signal OPS1' and the second output signal OPS2' without changing the frame frequency. This is because a motion blur phenomenon occurs if the frame frequency of the moving image is reduced and a display quality is deteriorated due to the motion blur phenomenon.

Descriptions on the other elements of the controller 100' are the same as those in FIGS. 2 to 6, and thus details thereof will be omitted.

Figure 8:
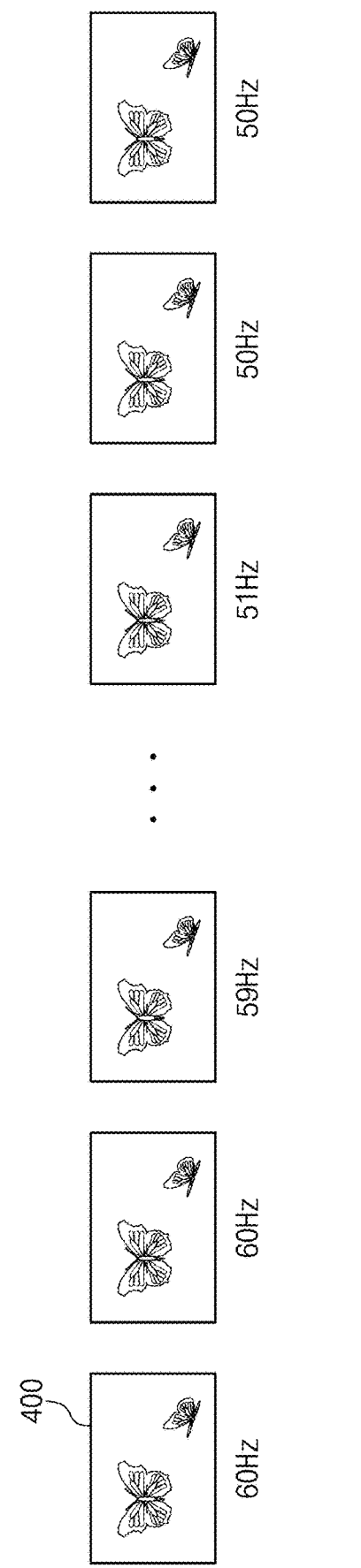
FIG. 8 is a view showing an exemplary embodiment of screen images to explain a method of driving a display device according the invention.

FIG. 8 is a view showing an exemplary embodiment of screen images to explain a method of driving a display device according to the invention.

Referring to FIGS. 7 and 8, the frequency changing output unit 203 may output a first final output signal obtained by reducing the frame frequency as much as a first frequency and a second final output signal obtained by reducing the frame frequency as much as a second frequency. In an exemplary embodiment, for example, the first frequency may be about 1 Hz, and the second frequency may be about 2 Hz.

In the case that the comparator 511 determines that each of the first output signal OPS1' and the second output signal OPS2' is the still image, the frequency changing output unit 203 may gradually reduce the frame frequency of each of the first output signal OPS1' and the second output signal OPS2'. FIG. 8 shows screen images the frequency of each of which is reduced by about 1 Hz every two frames, but the invention should not be limited thereto or thereby. That is, the frequency changing unit 203 may gradually reduce the frame frequency of the output signal using various methods.

As described above, since the frequency changing unit 203 gradually reduces the frame frequency of the output signal, a flicker phenomenon, which is caused by rapidly reducing the frame frequency of the output signal, may be effectively prevented from occurring.

Figure 9:
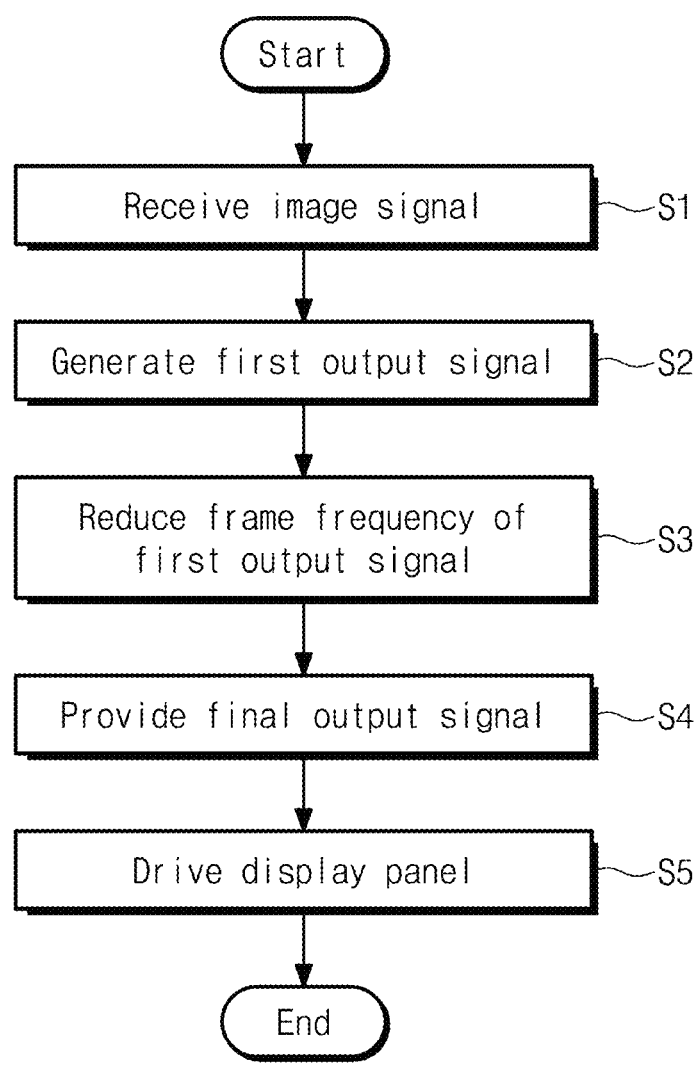
FIG. 9 is a flowchart showing an exemplary embodiment of a method of driving a display device according to the invention.

FIG. 9 is a flowchart showing an exemplary embodiment of a method of driving a display device according to the invention.

In the following descriptions, the image signal IPS corresponds to a first active period (not shown) of one frame (hereinafter, referred to as a "first frame"), and the final output signal OPS corresponds to a first conversion active period (not shown) of the first frame.

Referring to FIGS. 2 and 9, the timing changing unit 201 receives the first image signal IPS (S1). The timing changing unit 201 reduces the size and the blank time of the first image signal IPS to generate the first output signal OPS' (S2) as described above.

The frequency changing output unit 203 receives the first output signal OPS' and reduces the frame frequency of the first output signal OPS' to generate the final output signal OPS (S3). The frequency changing output unit 203 provides the final output signal OPS to the data driver 300 (refer to FIG. 1) (S4).

The data driver 300 converts the final output signal OPS to the data voltage and outputs the data voltage to the display panel 400 (refer to FIG. 1) to drive the display panel 400 (S5).

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
a controller which receives a first image signal corresponding to a first frame and comprising a first active period and a first blank period, and outputs a first output signal corresponding to the first frame and comprising a first conversion active period and a first conversion blank period, and
a display panel driven by the first output signal,
wherein a length of the first conversion active period is longer than a length of the first active period, and a length of the first conversion blank period is shorter than a length of the first blank period without increasing a frame frequency.

2. The display device of claim 1, wherein a first frame frequency of the first image signal and a second frame frequency of the first output signal are same as each other.

3. The display device of claim 1, wherein a first frame frequency of the first image signal is greater than a second frame frequency of the first output signal.

4. A display device comprising:
a controller which receives a first image signal corresponding to a first frame and comprising a first active period and a first blank period, and outputs a first output signal corresponding to the first frame and comprising a first conversion active period and a first conversion blank period, and
a display panel driven by the first output signal,
wherein a length of the first conversion active period is longer than a length of the first active period, and a length of the first conversion blank period is shorter than a length of the first blank period, and
wherein the length of the first conversion blank period is 0(zero).

5. The display device of claim 4, wherein a sum of the length of the first active period and the length of the first blank period is equal to the length of the first conversion active period.

6. A display device comprising:
a controller which receives a first image signal corresponding to a first frame and comprising a first active period and a first blank period, and receives a second image signal corresponding to a second frame following the first frame, outputs a first output signal corresponding to the first frame and comprising a first conversion active period and a first conversion blank period, outputs a second output signal corresponding to the second frame, and changes a frame frequency of the second output signal if the first image signal and the second image signal are same as each other, and
a display panel driven by the first output signal and the second output signal,
wherein a length of the first conversion active period is longer than a length of the first active period, and a length of the first conversion blank period is shorter than a length of the first blank period.

7. The display device of claim 6, wherein a frame frequency of the first output signal is greater than a frame frequency of the second output signal.

8. The display device of claim 7, wherein a difference between the frame frequency of the first output signal and the frame frequency of the second output signal is 10 Hz.

9. The display device of claim 7, wherein a difference between the frame frequency of the first output signal and the frame frequency of the second output signal is less than 10 Hz.

* * * * *